Jan. 21, 1947. E. F. KOHL 2,414,599
VARIABLE PITCH PROPELLER
Filed May 16, 1942 2 Sheets-Sheet 2
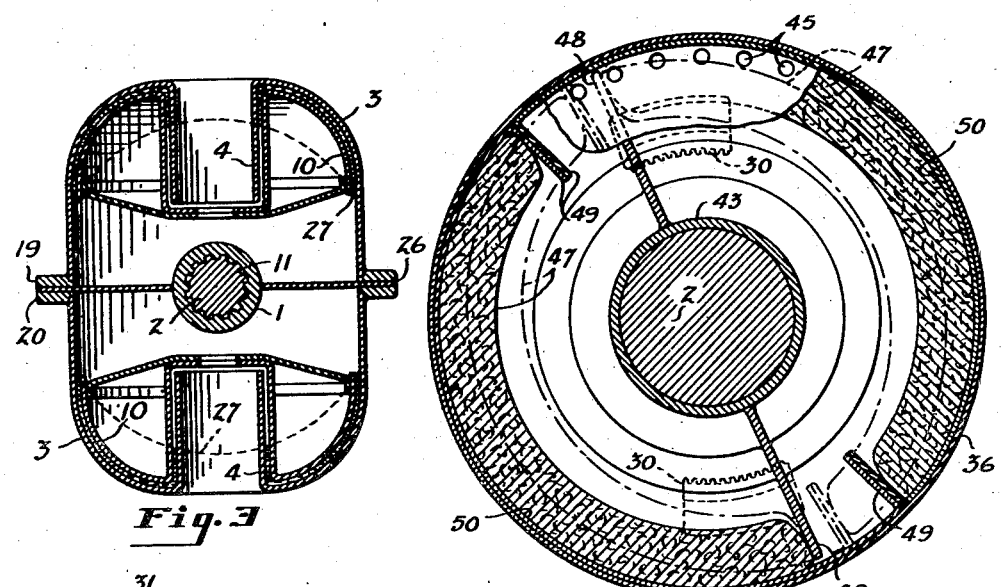
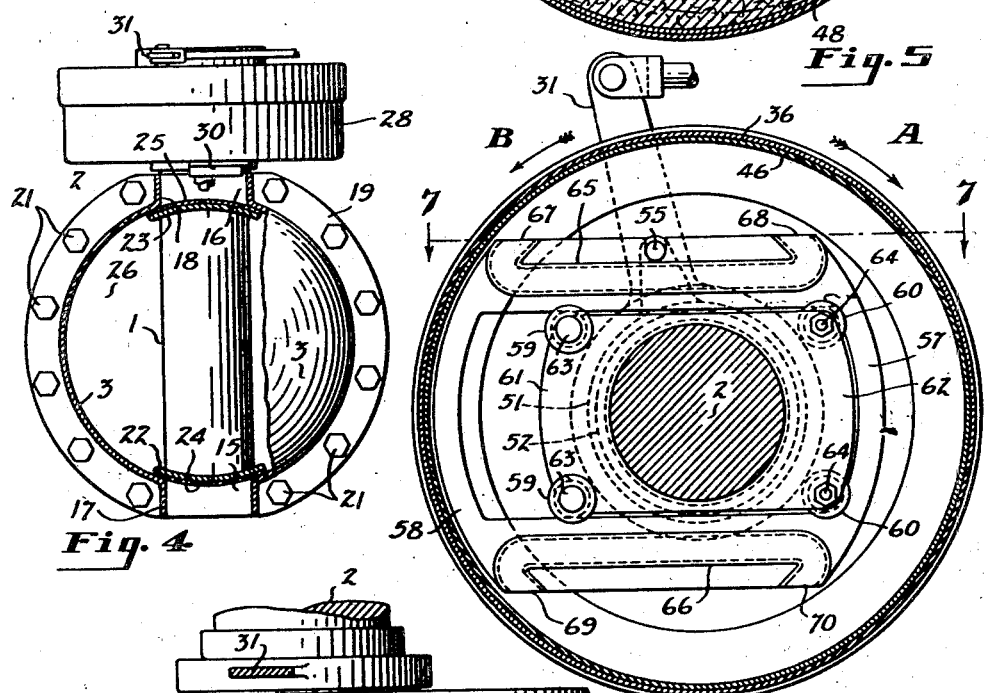
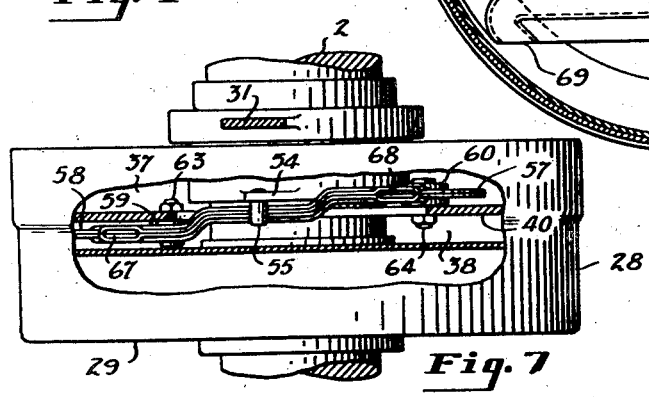
INVENTOR
Everard F. Kohl
BY John Mahoney
ATTORNEY Patented Jan. 21, 1947

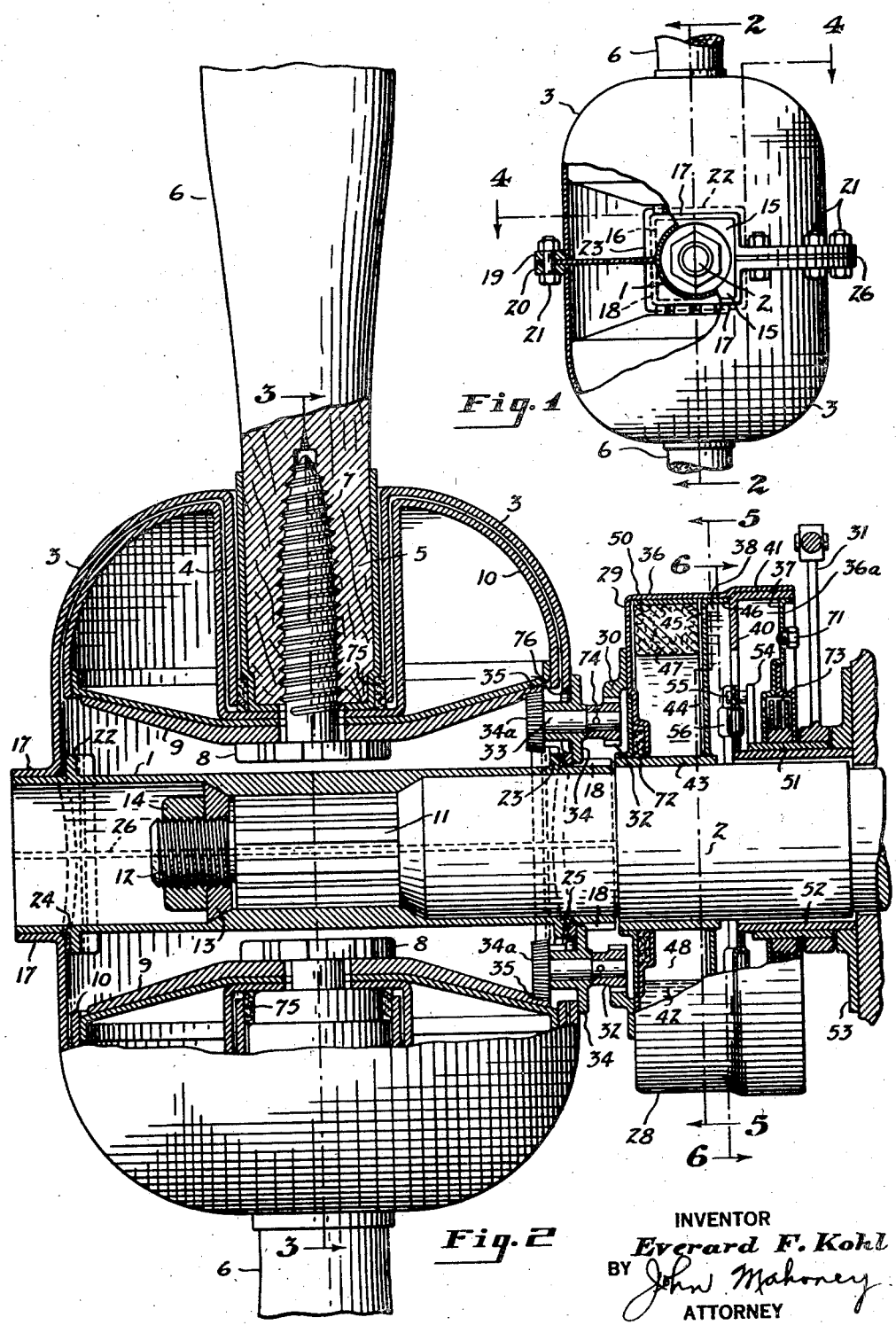

2,414,599

UNITED STATES PATENT OFFICE 2,414,599

VARIABLE PITCH PROPELLER

Everard F. Kohl, Cleveland, Ohio

Application May 16, 1942, Serial No. 443,206

12 Claims. (Cl. 170—163)

1

My invention relates to propellers and more particularly to aircraft propellers having a housing containing a liquid that acts as a bearing during rotation of the propeller. It also relates to an improved combination of an aircraft propeller containing a liquid which buoyantly counteracts the centrifugal force of the propeller blades during flight and a governor for controlling the pitch of the propeller blades.

In controlling the pitch of airplane propeller blades, it has heretofore been the practice to provide ball bearings between a thrust member attached to the root or stem of the propeller blades and a flange attached to the cylinder which receives the root of the blade. In such construction the cylinder is attached to or is formed integral with the propeller hub and torque is transmitted from an electric motor through a gear train or hydraulically to axially rotate the propeller blades to vary their pitch. Such means are not only expensive but the centrifugal force and vibration of the propeller blades during flight causes a brinelling action of the balls into their races which increases the torque necessary to vary the pitch of the blades.

It is the aim of the present invention to provide an improved propeller for aircraft containing a liquid which acts as a bearing during rotation of the propeller. For this purpose, my improved propeller comprises a housing affixed to or associated with the propeller hub which contains a liquid, such as mercury, and a casing which has the same general contour as the housing but is spaced therefrom to provide a chamber for the liquid during flight. It is also the purpose of my invention to provide an improved combination of a governor and a propeller containing a liquid which liquid acts as a bearing during flight and which by its centrifugally developed buoyant force counteracts the outward centrifugal force of the propeller blades, thus enabling the pitch of the propeller blades to be manually controlled by the simple adjustment of a control lever, irrespective of their revolving speed, or to be automatically controlled by properly setting the control lever prior to take off or during flight.

It is therefore an object of my invention to provide an improved aircraft propeller containing a liquid which functions as a bearing during flight.

Another object of my invention is to provide an improved aircraft propeller containing a liquid which acts as a bearing during flight and which by its centrifugally-developed buoyant force counteracts the outward centrifugal force of the propeller blades, thus enabling the pitch of the

2 propeller blades to be easily and rapidly controlled, irrespective of the rotative speed of the propeller.

A further object of my invention is to provide an improved combination of a propeller containing a liquid which liquid acts as a bearing during flight and a governor for varying the pitch of the propeller blades.

A still further object of my invention is to provide an improved combination of a propeller containing a liquid which liquid functions as a bearing during rotation of the propeller and a governor associated therewith which is adapted to be set in a predetermined position during take off and which is effective in automatically controlling the pitch of the propeller blades during flight.

My invention will be better understood by reference to the accompanying drawings in which:

Fig. 1 is an end elevational view of my improved propeller attached to an engine shaft;

Fig. 2 is an enlarged cross sectional view on the line 2—2 of Fig. 1, showing the propeller blade partly in elevation and partly in section and a cross sectional view of a governor associated with the engine shaft with parts in elevation;

Fig. 3 is a reduced cross sectional view on the line 3—3 of Fig. 2 with the propeller blades removed and the dotted lines showing the inner extremity of the liquid during the rotation of the propeller;

Fig. 4 is a cross sectional view on the line 4—4 of Fig. 1, showing a top plan view of the governor;

Figs. 5 and 6 are cross sectional views on the lines 5—5 and 6—6, respectively, of Fig. 2, looking in the direction of the arrows; and Fig. 7 is a cross sectional view on the line 7—7 of Fig. 6.

Although the principles of my invention may be applied to propellers of various types having any suitable number of blades, as illustrated in the drawings, a two blade propeller is shown in which the hub 1 of the propeller is removably secured to an engine shaft 2 of any suitable aircraft, such as an airplane. Affixed to the hub is a pair of housings 3, each of which has a re-entrant cylindrical portion 4 to receive the stem or root 5 of a propeller blade 6. The propeller blades are held in place by suitable means, such as a screw 7 having a flange 8 which bears against a bracket 9 attached to a member capable of being buoyed inwardly by the centrifugally developed force of a liquid, such as a casing 10 which is spaced from but corresponds in shape to housing 3.

The hub of the propeller may be affixed to the shaft of the engine and prevented from endwise movement in any suitable manner. As illustrated, the engine shaft is provided with a reduced splined portion 11 terminating in a threaded nose 12 and an enlarged portion on the hub is keyed thereto and is prevented from endwise movement relative thereto by bevel mating portions on the hub and shaft and by a bevel washer 13 held in engagement with a bevel portion on the hub by a nut 14.

The housings are rotatable with the hub and are secured together so that they may be readily assembled and dismantled. For this purpose, the opposite ends of hub 1 terminate in angular shaped portions, as indicated by the numerals 15 and 16, to receive angular shaped flanges 17 and 18 formed at opposite ends upon each of the housings and each housing is provided at opposite sides with outwardly extending flanges designated by the numerals 19 and 20, respectively. Flanges 19 and 20 are in mating relation with each other and are welded or otherwise secured to the respective housings. They are preferably formed of thicker metal than the housings to provide increased strength at the junction of the two housings and are firmly secured together by bolts 21. To prevent endwise movement of the housings upon the hub, the hub is provided adjacent each of its angular shaped portions with flanges 22 and 23, respectively.

As previously stated, each of the housings contains a liquid, such as mercury, and means are provided to prevent the liquid from escaping from the housings. For this purpose, gaskets 24 and 25 formed of a soft metal or other yieldable material, such as rubber, are interposed between hub flanges 22 and 23, respectively, and the housings. To provide a propeller which is in a balanced state, each housing contains the same, or substantially the same, quantity of liquid and while various means may be provided to insure this balanced relation, as illustrated, the outer edges of partitions 26 are interposed between flanges 19 and 20 and extend inwardly from both sides of the housing with their inner edges abutting the hub to which they may be suitably affixed, such as by welding, or if desired they may extend into longitudinally extending slots formed in the hub.

During the rotation of the engine shaft, the housing 3 and the propeller blades 6 are revolved about the axis of the shaft and the centrifugal force of the propeller blades tends to move the outer periphery of casing 10 against the inner periphery of the housing 3. The liquid in the housings, however, which is designated by the numeral 27, is thrown outwardly by centrifugal force and enters the chamber between housing 3 and casing 10, assuming substantially the form shown in Fig. 3 of the drawings. While any suitable liquid may be employed which is capable of buoying casing 10 inwardly during the revolution of the propeller blades, I prefer to utilize a liquid having a relatively high specific gravity. Mercury is particularly suitable because it not only has a high specific gravity but it also has lubricating properties. It will of course be understood that instead of utilizing a casing 10, any material which is capable of being buoyed inwardly may be employed, such as wood or molded material.

During the rotation of the propeller, the mercury exerts an inward buoyant force upon casing 10 which varies in accordance with the rotative speed of the propeller and the depth to which casing 10 is immersed in the liquid which of course is dependent upon the amount of mercury in the housing. As the rotative speed of the propeller is increased, the outward centrifugal force exerted on the propeller blades also increases. The mercury, however, exerts an inward buoyant force, one of the variants of which is the rotative speed of the propeller and consequently the centrifugally developed inward buoyant force of the mercury counteracts the outward centrifugal force of the propeller blades. The amount of mercury in housings 3 is approximately just sufficient to counteract the centrifugal force of the blades so that the pitch of the propeller blades may be easily regulated, irrespective of the rotative speed of the engine shaft.

While the pitch of the propeller blades may be controlled in any desired manner, such as by motor operated means, when the propeller contains a liquid which by its inward buoyant force counteracts the centrifugal force of the propeller blades, the pitch of the propeller blades may be readily controlled by a governor associated with the engine shaft as illustrated in the drawings.

As shown, the governor comprises a casing 28 mounted for limited rotation on the driving shaft 2 of the engine and has a side portion 29 to which segmental gears 30 having internal teeth may be suitably affixed, such as by welding. Gears 30 are operatively associated with casings 10 of the propeller in any suitable manner and serve to control the pitch of the propeller blades upon movement of a control lever 31 in opposite directions from a neutral position during rotation of the engine shaft although as will be more fully explained as the specification proceeds, control lever 31 may be initially set at take off and my improved governor will automatically control the pitch of the propeller blades during level flight or when diving. As illustrated, each gear 30 meshes with a pinion 32 attached to a shaft 33 extending through a bushing 34 which has a portion extending into a slot formed in angle portion 18 and is bolted, welded or otherwise secured to housing 3. The other end of each shaft 33 is provided with a bevel pinion 34a which meshes with a segmental gear 35 formed upon bracket 9 so that movement of casing 28 relative to shaft 2 varies the pitch of the propeller blades.

As illustrated in the drawings and more particularly in Figs. 2, 5, 6 and 7, the side portion 29 of the casing terminates in a peripheral portion 36 to which a cover 36a is secured by suitable means, such as welding. The casing is divided into a working chamber 38 and an auxiliary or reserve chamber 37 by suitable means, such as an inwardly extending partition 40 having a central opening and an annular flange 41 which is secured to the inner periphery of the casing by any desirable means, such as welding.

The casing contains a suitable liquid, such as mercury, as indicated by the numeral 42 and means are provided to control the pitch of the propeller blades in accordance with the quantity of liquid present in the working chamber which is regulated by control lever 31. For this purpose a sleeve 43 is affixed to the engine shaft and is provided at its inner portion with an outwardly extending flange 44 having a plurality of openings 45 adjacent its periphery and an angle portion 46 arranged in proximity to the inner periphery of the casing but spaced sufficiently therefrom to provide clearance for the rotation of the casing. Flange 44 cooperates with side portion 29 to provide a chamber for a plurality of segmental members or blocks 47 arranged between and adapted to abut against partitions 48 secured to and extending radially outwardly from sleeve 43 and flanges 49 extending radially inwardly from a lining 50 secured to the inner periphery of the casing. Segmental blocks 47 are formed of a material having a lower specific gravity than the liquid, such as wood, hollow metal, molded material, or the like.

During rotation of the engine shaft, the propeller is revolved in the usual manner and the propeller blades through gears 35 meshing with bevel pinions 34a and pinions 32 meshing with gears 30 rotate the casing 28 of the governor in unison with the engine shaft. When a liquid, such as mercury, is present in working chamber 38, however, it is picked up by the inner periphery of angle portion 46 during rotation of the casing and passes through openings 45 into the segment chamber, forming an annulus of liquid therein. The segmental blocks are also thrown outwardly by centrifugal force but when sufficient liquid is present and the casing is being rotated at sufficient speed, the segments are buoyed radially inwardly as indicated in dotted lines in Fig. 5 with a force depending upon the rotative speed of the casing and the depth to which the segmental blocks are immersed. During the inward movement of the segmental blocks, one end portion of each block engages one of the inwardly extending flanges on the lining of the casing and the casing is not only rotated with the engine shaft but relative thereto and gears 30 meshing with pinions 32 rotate shafts 33 causing bevel gears 34a to rotate segmental gears 35 to vary the pitch of the propeller blades.

Since the variation in the pitch is dependent upon the depth of immersion of the segmental blocks in the mercury and the rotative speed of the casing which latter factor is also dependent upon the rotative speed of the engine shaft, it will be apparent that at higher engine speeds, the propeller blades will automatically acquire a high pitch. It will also be apparent that when the rotative speed of the engine shaft slows down, the force upon the propeller blades which tends to return them to zero pitch will overcome the inward buoyant force of the mercury, thus providing a lower pitch.

One of the features of my invention, however, is to provide means for automatically controlling the pitch of the propeller blades during flight. This may be effected by setting control lever 31 at such a position that during take off, the amount of mercury that remains in or is transferred to working chamber 38 is slightly below the amount which causes inclination of the propeller blades during take off so that when the engine shaft begins to develop higher speed, the pitch of the propeller blades will be automatically increased. The control lever may also be set either at take off or during flight and tends to maintain the engine at the desired speed. For instance, when the motor speeds up as when diving, the governor automatically increases the pitch, thereby preventing the motor from racing.

As previously stated, the inward centrifugally-developed buoyant force of the liquid upon blocks 47 is dependent upon three factors; namely, the composition of the blocks, their depth of immersion in the liquid up to the point at which they are completely immersed, and the rotative speed of the liquid which rotates in unison with the casing. When the blocks are composed of a molded composition, as shown, only two variable factors remain, namely, the depth of immersion of the blocks in the liquid and the rotative speed of the casing. When the casing is rotating, the inward centrifugally-developed buoyant force of the liquid is of course opposed by the force upon the propeller blades which tends to maintain them at zero pitch or to return them to zero pitch if they are inclined.

It will therefore be apparent that at take off, the blades will either be at zero pitch or they will be inclined to only a limited extent. As the engine speed increases, however, the force upon the propeller blades which tends to maintain them at zero pitch is overcome by the centrifugally-developed inward buoyant force of the liquid upon the blocks which increases as the square of the speed of the casing and consequently the blocks are moved inwardly, causing rotation of casing 28 relative to shaft 2 to increase the pitch of the propeller blades. The inward movement of the blocks is limited because as they are moved inwardly, their depth of immersion in the liquid is decreased and consequently the inward buoyant force of the liquid is decreased. This decrease in the inward buoyant force of the liquid is partially neutralized, however, because during the inward movement of blocks 47, sufficient mercury flows from working chamber 38 through apertures 47 into the segment chamber to equalize the level of the liquid in the two chambers and partially occupies the space formed by the inward displacement of the blocks.

When the engine slows down, a reverse movement of the blocks occurs. This is due to the fact that while the force upon the propeller blades which tends to return them to zero pitch decreases as the engine slows down, the inward centrifugally-developed buoyant force of the liquid upon the blocks decreases at a much faster rate; namely, as the square of the speed, and consequently at a predetermined speed, depending upon the amount of liquid in the segment chamber, the force upon the propeller blades overcomes the inward centrifugally-developed buoyant force of the liquid and the blocks are moved outwardly. It will of course be apparent that as the blocks move outwardly, the inward centrifugally-developed buoyant force of the liquid increases due to the increase in the depth of immersion of the blocks in the liquid but this increase is partially neutralized because during their outward movement, the blocks displace part of the liquid in the segment chamber which flows through apertures 45 into the working chamber 38 until the level of liquid in the two chambers is equalized.

To provide means for regulating the quantity of liquid in working chamber 38, control lever 31 is affixed to a sleeve 51 forming a control device which is rotatably mounted upon a stationary bearing 52 having an outwardly extending flange 53 which may be connected to the casing of the engine as illustrated in Fig. 2. Sleeve 51 extends into the reserve chamber of the casing and is provided with a lug 54 having an inwardly extending pin 55 secured thereto which fits into a notch in a liquid transfer device designated generally in Fig. 2 by the numeral 56.

The liquid transfer device is designed to transfer liquid from auxiliary chamber 37 to working chamber 38 when the control lever is moved in one direction from a neutral position and to transfer liquid from working chamber 38 to auxiliary chamber 37 when the control device is moved in the opposite direction from a neutral position, and while any suitable liquid transfer means may be employed, such as one of those disclosed in my copending application, Ser. No. 309,271, filed on December 14, 1939, which has matured into Patent No. 2,307,797, as illustrated in the drawings, the liquid transfer device is formed from a pair of mating stampings secured together by any suitable means, such as spot welding, and has an end portion 57 offset in one direction to extend into reserve chamber 37 and an end portion 58 offset in the opposite direction to extend into working chamber 38 as shown in Fig. 7. The stampings are provided with a central opening forming inner side edges which ride upon rollers 59 and 60 affixed to guides 61 and 62 by means of bolts 63 and 64, as shown more particularly in Figs. 6 and 7 of the drawings. Guides 61 and 62 may be welded or otherwise secured to the inner portion of bearing 52 and to compensate for the offset end portions, rollers 59 are arranged on one side of guide 61 whereas rollers 60 are arranged on the opposite side of guide 62.

The central opening in the stamping is considerably longer than the guides to permit limited longitudinal movement of the liquid transfer means in the casing and the stampings are arranged in juxtaposition to each other with the exception that at the upper and lower portion of the stampings, substantially U-shaped indentations opposed to each other are formed in the stampings to provide substantially straight tubular portions 65 and 66 which terminate in oppositely inclined arcuate-shaped passages. As illustrated in the drawings, passages 67 and 68 of the upper tubular portion are inclined upwardly and passages 69 and 70 of the lower tubular portion are inclined downwardly to facilitate transfer of liquid between the chambers without excessive splashing, irrespective of the direction of rotation of the casing. For instance, assuming that the liquid is in working chamber 38 and it is desired to transfer it to reserve chamber 37, control lever 31 is moved from its neutral to its full line position, as shown in Fig. 6, and when the casing is rotated in the direction indicated by arrow A, liquid scooped from the casing enters tube 66 through passage 69 in a direction which is substantially tangential to the direction of rotation of the liquid and is discharged into reserve chamber 38 through passage 70 in a direction which is substantially tangential to the direction of rotation of the liquid. On the other hand when the casing is rotated in the direction indicated by the arrow B, liquid scooped from the casing enters tube 65 from working chamber 38 through passage 67 in a direction which is substantially tangential to the direction of rotation of the liquid and is discharged into reserve chamber 37 through passage 68 in a direction which is substantially tangential to the direction of rotation of the liquid. When control lever 31 is moved in the opposite direction from its neutral position, it moves the liquid transfer device into engagement with the opposite guide 61 and liquid is transferred from reserve chamber 37 to working chamber 38, irrespective of the direction of rotation of the liquid, in the same manner.

The mercury may be introduced into the casing through an aperture which is normally closed by a removable plug 71 and appropriate sealing means designated by numerals 72 and 73 may be provided to prevent leakage of mercury between sleeves 43 and 51 and the sides of the casing. Sealing means 75 may also be provided to prevent the escape of mercury between the propeller root and housing 3.

In dismantling the propeller, pins 74 connecting pinions 32 to shafts 33 and nut 14 are first removed and hub 1 is moved longitudinally to the left on the engine shaft as shown in Fig. 2. The housings may then be dismantled by removing bolts 21. If bushings 34 are bolted to housings 3, they may also be removed and pinions 34a may be withdrawn through openings 76 formed in the housings.

What I claim is:

1. Apparatus of the class described comprising a rotatable shaft, a propeller including a blade mounted on said shaft to rotate therewith and said blade being rotatable on its axis to vary its pitch, a casing rotatably mounted on said shaft which casing has means extending inwardly therefrom to form an abutment, means connected to said blade and said casing for rotating said casing in unison with said shaft during the rotation of said shaft and for rotating said blade on its axis to vary its pitch when the casing is rotated relative to said shaft, means connected to said shaft within said casing and extending radially outward therefrom to form a second abutment which is angularly spaced from the first abutment, and means arranged between said abutments which is movable radially inward in response to the rotation of said casing at a predetermined speed for engaging the first abutment and rotating said casing relative to said shaft to vary the pitch of said blade.

2. Apparatus of the class described comprising a rotatable shaft, a propeller including a blade mounted on said shaft to rotate therewith and said blade being rotatable on its axis to vary its pitch, a casing rotatably mounted on said shaft which casing has means extending inwardly therefrom to form a first abutment, means connected to said blade and said casing for rotating said casing in unison with said shaft during rotation of said shaft and for rotating said blade on its axis to vary its pitch when the casing is rotated relative to said shaft, means connected to said shaft within said casing and extending radially outward therefrom to form a second abutment, and a block arranged between said abutments which is movable radially inward in response to the rotation of said casing at a predetermined speed for engaging the first abutment and rotating said casing in one direction relative to said shaft to increase the pitch of said blade, and said casing being rotatable in the opposite direction relative to said shaft and the block being movable radially outward into engagement with said casing by the force upon said blade which tends to return the blade to zero pitch when the casing falls below the predetermined speed.

3. Apparatus of the class described comprising a rotatable shaft, a propeller including a blade mounted on said shaft to rotate therewith and said blade being rotatable on its axis to vary its pitch, a casing rotatably mounted on said shaft and containing a liquid, said casing having means extending inwardly therefrom to form a first abutment, means connected to said blade and said casing for rotating said casing in unison with said shaft during the rotation of said shaft and for rotating said blade on its axis to vary its pitch when the casing is rotated relative to said shaft, means connected to said shaft within said casing and extending radially outward therefrom to form a second abutment which is angularly spaced from the first abutment, and means arranged between said abutments which is movable radially inward by the centrifugally-developed buoyant force of the liquid in said casing when said casing is rotated at a predetermined speed for engaging the first abutment and rotating said casing relative to said shaft to vary the pitch of said blade.

4. Apparatus of the class described comprising a rotatable shaft, a propeller including a blade mounted on said shaft to rotate therewith and said blade being rotatable on its axis to vary its pitch, a casing rotatably mounted on said shaft and containing a liquid, said casing having means extending inwardly therefrom to form a first abutment, means connected to said blade and said casing for rotating said casing in unison with said shaft during the rotation of said shaft and for rotating said blade on its axis to vary its pitch when the casing is rotated relative to said shaft, means connected to said shaft within said casing and extending radially outward therefrom to form a second abutment which is angularly spaced from the first abutment, and a block arranged between said abutments which is movable radially inward by the centrifugally-developed buoyant force of said liquid when said casing is rotated at a predetermined speed for engaging the first abutment and rotating said casing in one direction relative to said shaft to increase the pitch of said blade, and said casing being rotatable in the opposite direction relative to said shaft and the block being movable radially outward into engagement with said casing by the force upon said blade which tends to return the blade to zero pitch when the casing falls below the predetermined speed.

5. Apparatus of the class described comprising a rotatable shaft, a propeller including a plurality of blades mounted on said shaft to rotate therewith and each of said blades being rotatable on its axis to vary its pitch, a casing rotatably mounted on said shaft and containing a liquid, said casing having means extending inwardly therefrom to form a first abutment, means connected to each of said blades and said casing for rotating said casing in unison with said shaft during the rotation of said shaft and for rotating each of said blades on its axis to vary its pitch when the casing is rotated relative to said shaft, means connected to said shaft within said casing and extending radially outward therefrom to form a second abutment which is angularly spaced from the first abutment, and means arranged between said abutments which is movable radially inward by the centrifugally-developed buoyant force of the liquid in said casing for engaging the first abutment and rotating said casing relative to said shaft to vary the pitch of said blades.

6. Apparatus of the class described comprising a rotatable shaft, a propeller including a plurality of blades mounted on said shaft to rotate therewith and each of said blades being rotatable on its axis to vary its pitch, a casing rotatably mounted on said shaft and containing a liquid, said casing having means extending inwardly therefrom to form a first abutment, means connected to each of said blades and said casing for rotating said casing in unison with said shaft during the rotation of said shaft and for rotating each of said blades on its axis to vary its pitch when the casing is rotated relative to said shaft, means connected to said shaft within said casing and extending radially outward therefrom to form a second abutment which is angularly spaced from the first abutment, and a block arranged between said abutments which is movable radially inward by the centrifugally-developed buoyant force of said liquid when said casing is rotated at a predetermined speed for engaging the first abutment and rotating said casing in one direction relative to said shaft to increase the pitch of said blade, and said casing being rotatable in the opposite direction relative to said shaft and the block being movable radially outward into engagement with said casing by the force upon said blades which tends to return them to zero pitch when the casing falls below the predetermined speed.

7. Apparatus of the class described comprising a rotatable shaft, a propeller including a plurality of blades mounted on said shaft to rotate therewith and each of said blades being rotatable on its axis to vary its pitch, a casing rotatably mounted on said shaft and being provided with a working chamber and a reserve chamber, said casing having a peripheral portion and means extending radially inward from the peripheral portion to form a first abutment, means connected to each of said blades and said casing for rotating said casing in unison with said shaft during rotation of said shaft and for rotating each of said blades on its axis to vary its pitch when the casing is rotated relative to said shaft, means for transferring liquid between said chambers during the rotation of said casing to regulate the quantity of liquid in said working chamber, means connected to said shaft within said casing and extending radially outward therefrom to form a second abutment which is angularly spaced from the first abutment, and means arranged between said abutments which is movable radially inward by the centrifugally-developed buoyant force of the liquid in the working chamber during the rotation of said casing to an extent dependent upon the rotative speed of said casing and the amount of liquid in the working chamber and which engages the first abutment to rotate said casing relative to said shaft to vary the pitch of each of said blades.

8. Apparatus of the class described comprising a rotatable shaft, a propeller including a plurality of blades mounted on said shaft to rotate therewith and each of said blades being rotatable on its axis to vary its pitch, a casing rotatably mounted on said shaft and having a working chamber containing a liquid, said casing having a peripheral portion and means extending radially inward from the peripheral portion to form a first abutment, means for regulating the quantity of liquid in said chamber during the rotation of said casing, means connected to each of said blades and said casing for rotating said casing in unison with said shaft during the rotation of said shaft and for rotating each of said blades on its axis to vary its pitch when the casing is rotated relative to said shaft, means connected to said shaft within said casing and extending radially outward therefrom to form a second abutment which is angularly spaced from the first abutment, and a block arranged between said abutments which is movable radially inward by the centrifugally-developed buoyant force of the liquid in the working chamber of said casing during the rotation of said casing to an extent depending upon the amount of liquid in the working chamber and which block engages the first abutment during its inward movement to rotate said casing relative to said shaft to vary the pitch of each of said blades.

9. Apparatus of the class described comprising a rotatable shaft, a propeller including a plurality of blades mounted on said shaft to rotate therewith and each of said blades being rotatable on its axis to vary its pitch, a casing rotatably mounted on said shaft and being provided with a working chamber and a reserve chamber, said casing having a peripheral portion and means extending radially inwardly from the peripheral portion to form a first abutment, means for transferring liquid between said chambers during rotation of said casing, means connected to each of said blades and said casing for rotating said casing in unison with said shaft during rotation of said shaft and for rotating each of said blades on its axis to vary its pitch when the casing is rotated relative to said shaft, means connected to said shaft within said casing and extending radially outward therefrom to form a second abutment which is angularly spaced from the first abutment, and a block arranged between said abutments which is movable radially inward by the centrifugally-developed buoyant force of the liquid in the working chamber when the casing is rotated at a predetermined speed to an extent dependent upon the rotative speed of said casing and the amount of liquid in the working chamber and which block engages the first abutment during its inward movement to rotate said casing relative to said shaft to vary the pitch of said blades.

10. Apparatus of the class described comprising a rotatable shaft, a propeller including a plurality of blades mounted on said shaft to rotate therewith and each of said blades being rotatable on its axis to vary its pitch, a casing rotatably mounted on said shaft having a peripheral portion and a plurality of inwardly extending flanges and said casing being provided with a working chamber and a reserve chamber, means for transferring liquid between said chambers during rotation of said casing including a control lever movable to different positions to regulate the quantity of liquid in the working chamber during rotation of said casing, means connected to each of said blades and said casing for rotating said casing in unison with said shaft during rotation of said shaft and for varying the pitch of each of said blades when the casing is rotated relative to said shaft, means connected to said shaft within said casing and provided with a plurality of outwardly extending flanges, and a plurality of segmental blocks arranged in said casing, each of said blocks being interposed between a flange connected to said shaft and a flange extending inwardly from said peripheral portion, and each of said blocks being movable radially inward by the centrifugally-developed buoyant force of said liquid in the working chamber during the rotation of said casing to an extent dependent upon the rotative speed of said casing and the amount of liquid in the working chamber for engaging a flange extending inwardly from said peripheral portion to rotate said casing relative to said shaft to vary the pitch of said blades.

11. Apparatus of the class described comprising a rotatable shaft, a propeller including a plurality of blades mounted on said shaft to rotate therewith and each of said blades being rotatable on its axis to vary its pitch, and means for automatically varying the pitch of said blades during flight including a casing rotatably mounted on said shaft and having a working chamber containing a liquid, said casing having means extending inwardly therefrom to form a first abutment, means connected to each of said blades and casing for rotating said casing in unison with said shaft and for varying the pitch of said blades when the casing is rotated relative to said shaft, means connected to said shaft within said casing and extending radially outward therefrom to form a second abutment which is angularly spaced from the first abutment, a block arranged between said abutments which is movable radially inward by the centrifugally-developed buoyant force of the liquid in the working chamber of said casing during the rotation of said casing to an extent dependent upon the rotative speed of said casing and the amount of liquid in the working chamber and which block engages the first abutment during its inward movement to rotate said casing relative to said shaft to vary the pitch of said blades, and the amount of liquid in said working chamber being insufficient to cause more than a slight inclination of said blades at low speed but being sufficient to cause substantial inclination of the blades at high speed.

12. Apparatus of the class described comprising a rotatable shaft, a propeller including a plurality of blades mounted on said shaft to rotate therewith, a casing rotatable on said shaft having a peripheral portion and a plurality of inwardly extending flanges, said casing having a working chamber and a reserve chamber and containing a liquid, means for transferring liquid between said chambers during rotation of said casing including a control lever movable to different positions to regulate the quantity of liquid in the working chamber during rotation of said casing, means connected to each of said blades and said casing for rotating said casing in unison with said shaft during rotation of said shaft and for varying the pitch of each of said blades when the casing is rotated relative to said shaft, means connected to said shaft within said casing and provided with a plurality of outwardly extending flanges, a plurality of segmental blocks in said casing, each of said blocks being interposed between a flange connected to said shaft and a flange extending inwardly from the peripheral portion of said casing, and each of said blocks being movable radially inwardly by the centrifugally-developed buoyant force of said liquid in the working chamber during rotation of said casing to an extent dependent upon the rotative speed of said casing and the amount of liquid in the working chamber for engaging a flange extending inwardly from the peripheral portion to rotate said casing relative to said shaft to vary the pitch of said blades and said control lever being adapted to be set in a position in which the amount of liquid in the working chamber is insufficient to cause more than a slight inclination of said blades at low speed but is present in an amount sufficient to cause substantial inclination of the blades at high speed.

EVERARD F. KOHL.